United States Patent
Douziech et al.

(10) Patent No.: US 9,050,569 B2
(45) Date of Patent: Jun. 9, 2015

(54) THIN LAYER FIXED BED REACTOR FOR THE CHEMICAL TREATMENT OF A FINELY DIVIDED CATALYTIC SOLID

(75) Inventors: Damien Douziech, Rueil Malmaison (FR); Gilles Causse, Ales (FR); Eric Caprani, Paris (FR); Jean Christophe Viguie, Lyons (FR); Jean Marc Schweitzer, Villette de Vienne (FR); Ann Forret, Longes (FR)

(73) Assignees: -ENI S.P.A., Rome (IT); -IFP Energies Nouvelles, Rueil-Malmaison Cedex (FR)

( * ) Notice: Subject to any disclaimer, the term of this patent is extended or adjusted under 35 U.S.C. 154(b) by 865 days.

(21) Appl. No.: 12/682,277

(22) PCT Filed: Sep. 15, 2008

(86) PCT No.: PCT/FR2008/001287
§ 371 (c)(1),
(2), (4) Date: Dec. 6, 2010

(87) PCT Pub. No.: WO2009/071758
PCT Pub. Date: Jun. 11, 2009

(65) Prior Publication Data
US 2011/0070149 A1  Mar. 24, 2011

(30) Foreign Application Priority Data
Oct. 10, 2007  (FR) ..................................... 07 05776

(51) Int. Cl.
*B01J 8/02* (2006.01)
*C10G 2/00* (2006.01)
*B01J 37/18* (2006.01)
*B01J 8/00* (2006.01)
(Continued)

(52) U.S. Cl.
CPC ............... *B01J 8/009* (2013.01); *B01J 8/0214* (2013.01); *B01J 2208/021* (2013.01); *C10G 2/34* (2013.01); *B01J 8/0278* (2013.01); *B01J 8/02* (2013.01); *B01J 8/0207* (2013.01); *B01J 8/065* (2013.01); *B01J 8/12* (2013.01); *B01J 23/75* (2013.01); *B01J 35/023* (2013.01); *B01J 37/18* (2013.01); *B01J 2208/022* (2013.01); *B01J 2219/00031* (2013.01); *B01J 2219/185* (2013.01); *B01J 2219/1923* (2013.01); *C10G 2/32* (2013.01); *C10G 2300/703* (2013.01)

(58) Field of Classification Search
None
See application file for complete search history.

(56) References Cited

U.S. PATENT DOCUMENTS 2,270,360 A * 1/1942 Voorhees ...................... 208/146
3,837,092 A * 9/1974 Mayer ............................ 34/168
(Continued)

FOREIGN PATENT DOCUMENTS

EP  0 872 277 A1  10/1998
JP  56087426 A *  7/1981
(Continued)

OTHER PUBLICATIONS

International Search Report of PCT/FR2008/001287 (May 11, 2009).

*Primary Examiner* — Jennifer A Leung
(74) *Attorney, Agent, or Firm* — Millen, White, Zelano, Branigan, P.C.

(57) ABSTRACT

The present invention describes a thin layer fixed bed reactor intended for chemical treatments, in particular reduction of a Fischer-Tropsch synthesis catalyst. The reactor is designed in the form of similar, compact modules and operates with a ratio of linear pressure drop to outlet pressure which falls within certain limits.

22 Claims, 3 Drawing Sheets

(51) Int. Cl.
*B01J 8/06* (2006.01)
*B01J 8/12* (2006.01)
*B01J 23/75* (2006.01)
*B01J 35/02* (2006.01)

(56) References Cited

U.S. PATENT DOCUMENTS 3,954,449 A * 5/1976 Rudorfer et al. ............. 75/419
4,048,057 A * 9/1977 Murphy ........................ 208/89
5,073,352 A * 12/1991 Dang Vu et al. .............. 422/213
5,916,531 A 6/1999 Pan
6,103,652 A 8/2000 Brunet et al.

FOREIGN PATENT DOCUMENTS

WO WO 03/001131 A1 1/2003
WO WO 2005/009608 A1 2/2005

* cited by examiner

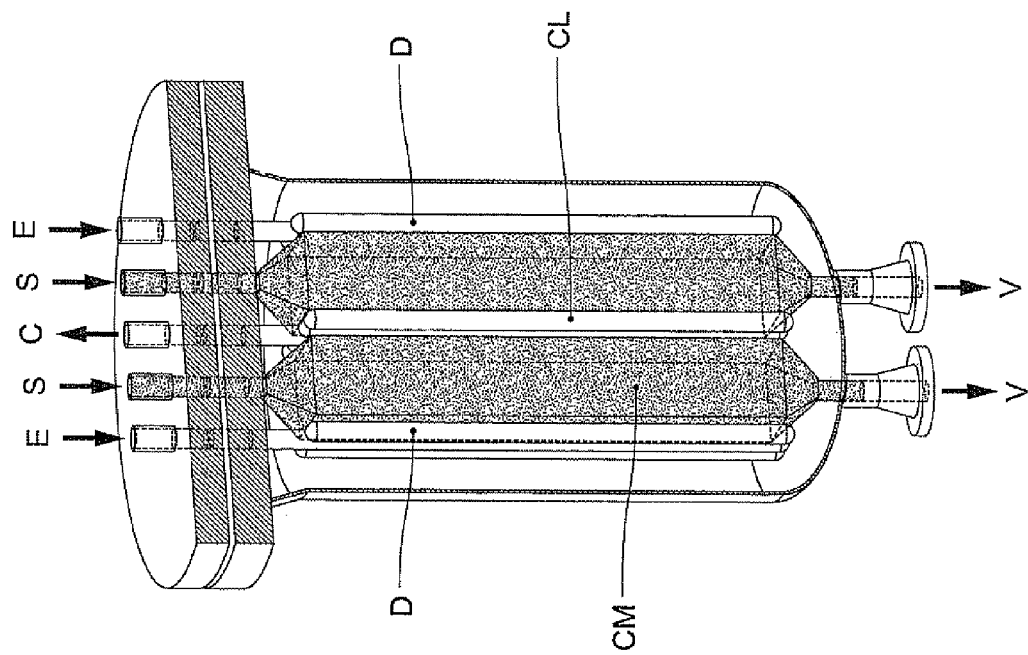
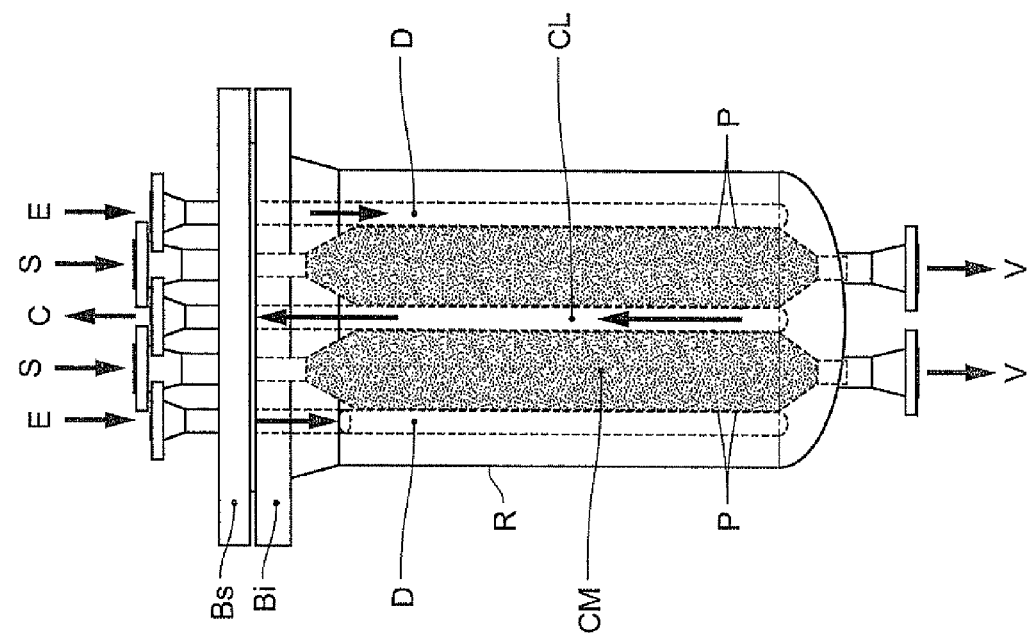

THIN LAYER FIXED BED REACTOR FOR THE CHEMICAL TREATMENT OF A FINELY DIVIDED CATALYTIC SOLID

FIELD OF THE INVENTION

The present invention relates to a thin layer fixed bed reactor intended to carry out chemical reactions of oxidation or reduction of divided solids (extrudates, beads or powders) used as catalysts or catalyst precursors in refining or petrochemical processes.

More particularly, the present invention may be applied to reduction by hydrogen of a Fischer-Tropsch synthesis catalyst based on cobalt for use in the liquid phase.

The Fischer-Tropsch synthesis catalyst is generally constituted by fine solid particles with a diameter in the range 30 to 100 micrometres (or microns, abbreviated to µm in the remainder of the text).

Said catalyst is generally in its oxide form ($CO_3O_4$) following synthesis. Thus, a step for reduction should be carried out before using the catalyst in the Fischer-Tropsch synthesis reactor.

This reduction step is carried out using a reducing gas which is pure hydrogen or hydrogen diluted in an inert gas.

The present invention concerns a reactor which can carry out said catalyst reduction step under optimum conditions as regards the residence time of the reagent gas, the pressure drop and maintaining the solid to be treated.

EXAMINATION OF THE PRIOR ART

The prior art in the field of reactors for the preparation and treatment of catalysts principally depends on the granulometry of the solid to be treated. In general, when the solid to be treated is in the form of particles on the millimeter scale, the reactors are of the fixed bed type or occasionally of the moving bed type. The term "moving bed" means a bed of particles which are flowing slowly, on the scale of a meter per hour, with relatively limited relative displacements between the particles.

When the granulometry of the particles reaches values on the scale of a hundred microns, fluidized bed reactors are generally used, i.e. reactors in which the particles are dissociated and moved with respect to each other using a fluidization fluid which passes through the bed from bottom to top.

The skilled person is well aware that fluidized beds can mix and transfer heat, which renders them particularly advantageous when carrying out exothermic or endothermic reactions. In contrast, they generally necessitate gas-solid separation systems which vary in complexity depending on the fluidization rates employed and are located downstream of the bed, and an optional system for recycling the solid particles inside the bed.

Given the granulometry of the solid to be treated, in the range 30 to 100 microns, the prior art consists of a fluidized bed reactor, the reagent gas also acting as a fluidization gas.

However, a fluidized bed reactor is not very well suited to reduction of a Fischer-Tropsch synthesis catalyst using hydrogen. Fluidized bed reactors are renowned for their properties of mixing and homogeneity due to the motion of the solid particles which are on average (over time and space) in contact with the same gas phase.

Further, in the case of a fluidized bed, dilution of the reagent by an inert gas which participates in fluidization is very rapidly limited by the rate of entrainment of the smallest particles of solid.

In the case of reduction of Fischer-Tropsch synthesis catalysts using hydrogen, another phenomenon must be taken into account: the reduction with hydrogen is accompanied by a release of water the partial pressure of which in the reaction effluent increases as the reaction progresses. However, the skilled person will be aware that this partial pressure of water has an inhibiting action on the reduction.

A fixed bed reactor functioning in a near piston regime has, under such conditions, a water vapor concentration gradient which rises from the inlet to the outlet of the reactor over the assembly of layers of solid to be treated. Thus, it is better adapted than a fluidized bed reactor since the first layers of solid will experience a partial pressure of water which is much lower than in the final layers.

Further, the partial pressure of water can readily be maintained below a maximum value, this maximum value being reached on the final layers of solid by accurately calculating the hydrogen dilution in the reagent mixture at the inlet.

Further, the present reactor aims to produce a DP/z/Ps ratio in the range $0.1\ m^{-1}$ to $10\ m^{-1}$, preferably in the range $0.5\ m^{-1}$ to $5\ m^{-1}$.

In this expression, DP represents the pressure drop across the bed, "z" the thickness of the bed, and Ps represents the pressure at the outlet from the bed.

A high DP/z/Ps ratio means that the velocity of the gas at the bed outlet is increased with respect to that at the inlet, which results in faster evacuation of the water formed along the bed, in particular over the final layers. On the other hand, the value of this ratio must be limited so as not to result in too high a pressure drop.

The optimum ratio may be obtained by adjusting the pressure at the bed outlet (Ps) and the bed thickness (z). The optimum ratio is in the range $0.1\ m^{-1}$ to $10\ m^{-1}$, preferably in the range $0.5\ m^{-1}$ to $5\ m^{-1}$.

Finally, fluidized bed reactors may in some cases exhibit difficulties as regards good distribution of gas, except for using distribution systems which cause large pressure drops.

In the case of fixed beds, because of the low particle size, the permissible pressure drop limit across the bed is rapidly reached, whence the limit on the thickness of the layer of solid to be treated, and whence also the search for a distribution system which has a smaller pressure drop.

The reactor for treating the catalyst of the present invention is thus a fixed bed, thin layer reactor which means that the layer of particles to be traversed has a limited thickness because of pressure drops. This thickness is generally in the range 10 to 500 mm, preferably in the range 50 to 300 mm, and more preferably in the range 100 to 200 mm.

The reactor of the invention is also modular in design, i.e. it is constituted by a plurality of similar modules, operating in parallel, each module comprising at least one thin layer, and usually two thin layers of identical thickness.

The various modules are termed "similar" as regards the shape, but may have different sizes while retaining a similarity of form. This is what is meant by the expression "similar modules". In certain particular cases, the modules may have the same size and will thus be identical.

Said modules are enclosed in a common vessel constituting the envelope of the reactor.

Two principal configurations are employed; an annular configuration in which the thin layers have an annular form, and a planar configuration in which the thin layers have a parallelepipedal form.

Thus, the reactor comprises an outer envelope enclosing an assembly of similar modules, each module having a reagent fluid distribution system which is intended to ensure as homogeneous a distribution as possible over the module under consideration, a system for collecting the effluents after traversing said module, a system for admitting solid to be treated into the module and a system for evacuating treated solid from the module. Certain of these various systems may be common to several modules.

In the majority of cases the modules constituting the reactor will have in common at least one of the 4 systems for introducing or distributing fluids and for collecting or evacuating solid.

In the context of the present invention, any combination of systems which are common to the modules may be envisaged, but the preferred combination is that in which each module has two thin layers, two reagent fluid distribution systems, one of the two reagent fluid distribution systems being common with the neighbouring module, a system for collecting reaction effluent, a system for admitting solid supplying each thin layer, and a system for evacuating treated solid which is common to all of the modules.

In such a configuration, the reactor may function with a reduced number of modules if certain of them have to be taken out of service for maintenance or for any other reason.

Further, the reactor of the invention operates discontinuously, corresponding to quantities of solid treated per module in the range 30 kg to 2500 kg, preferably in the range 50 kg to 1000 kg, and more preferably in the range 100 kg to 500 kg.

The number of modules operating in parallel is generally in the range 2 to 20, and preferably in the range 4 to 12.

BRIEF DESCRIPTION OF THE FIGURES

FIGS. 1a and 1b correspond to a sectional view (1a) and a perspective view (1b) of a reactor with one module in accordance with the invention in which the hatched lines show the thin layers of the solid to be treated. The module has a planar geometry.

BRIEF DESCRIPTION OF THE INVENTION

Figure 2A:
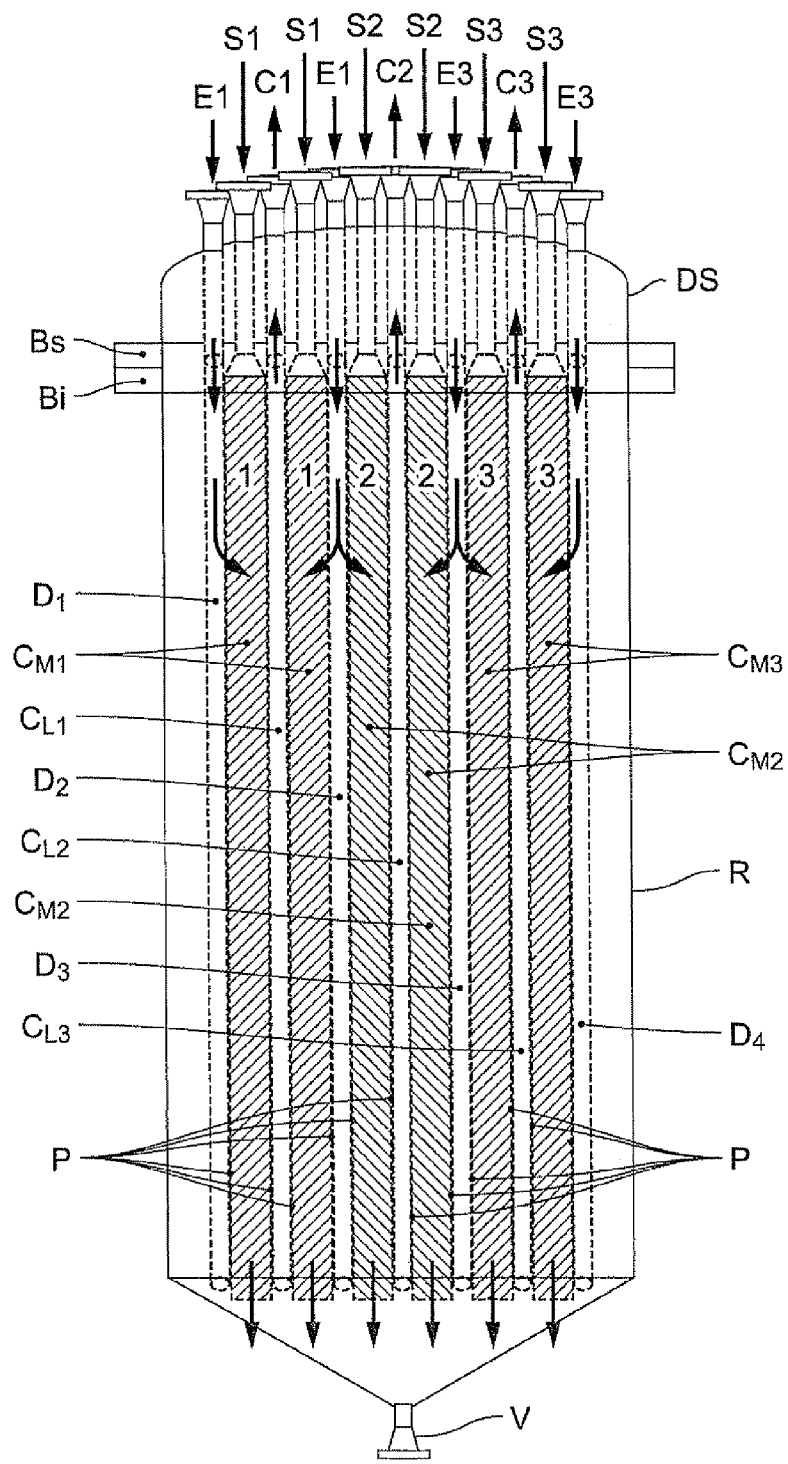
FIG. 2a corresponds to a sectional view of a reactor in accordance with the invention using a planar geometry, comprising 3 modules.

The present invention consists of a reactor intended to carry out a chemical or thermal treatment on solid particles with a diameter in the range 30 to 500 microns.

More particularly, one application of the reactor of the invention concerns the step for reduction of a Fischer-Tropsch synthesis catalyst using hydrogen. This catalyst is generally a catalyst based on cobalt (which may or may not be supported) which is in the form of fine particles with a diameter in the range 30 to 100 microns.

Another application of the reactor of the present invention concerns the reduction of catalysts based on noble metals used in processes for reforming gasoline type cuts with a distillation range in the range 80° C. to 300° C.

Another possible application of the reactor of the invention concerns drying powder such as particles of catalytic cracking catalyst with a diameter in the range 30 to 300 microns.

The reactor of the present invention comprises an assembly of modules functioning in parallel, the disposition of the various modules in the reactor constituting a characteristic element of the reactor.

Two principal configurations are used—an annular configuration in which the modules are annular in form, and a planar configuration in which the modules have a parallelepipedal form.

The reactor of the invention comprises an outer envelope enclosing an assembly of modules, each module having a system for distribution of reagent fluid and for collecting effluents, as well as a system for admission and evacuation of the solid. Certain of these systems for distribution or collection of fluids and admission or evacuation of solid may be common to several modules.

The system for distribution of reagent fluid is intended to ensure as homogeneous a distribution as possible over each of the modules. Moreover, the systems for distribution of reagent fluid and collection of effluents are calculated to have as low a pressure drop as possible.

Further, the reactor of the invention has a discontinuous function corresponding to quantities of treated solid in the range 30 kg to 2500 kg, preferably in the range 50 kg to 1000 kg, and more preferably in the range 100 kg to 500 kg per module. The brief description below is made with the assistance of FIGS. 1a and 1b.

Thus, the present invention consists of a fixed bed reactor with thin layers constituted by an assembly of similar modules M, operating in parallel, enclosed in a common vessel R constituting the envelope of the reactor.

The chemical treatment carried out on the catalyst using the reactor of the invention is generally termed reduction by the skilled person and employs a reagent gas containing hydrogen, the other component being an inert gas, generally nitrogen.

Any degree of dilution with nitrogen may be employed, but the preferred dilution is located between 25% and 35% by volume of nitrogen in the mixture.

The hydrogen used generally has a maximum oxygen content of 50 ppm, preferably less than 10 ppm, more preferably less than 2 ppm.

The hydrogen used generally has a CO content of less than 50 ppm, preferably less than 10 ppm, more preferably less than 1 ppm, and the $CO_2$ content is less than 1000 ppm, preferably less than 150 ppm, and more preferably less than 20 ppm.

It is possible to admit into the hydrogen a certain quantity of light hydrocarbons containing 1 to 4 carbon atoms, generally methane. Their maximum content is less than 15% by volume, preferably less than 5% by volume, and more preferably less than 1% by volume.

The dew point of the hydrogen is generally in the range −60° C. to 0° C., preferably in the range −50° C. to −30° C., and more preferably in the range −50° C. to −40° C.

Preferably, before diluting it with nitrogen, high purity hydrogen (99.95%) is used. A reactor R as shown in FIG. 1a shows a module with a planar geometry corresponding to treatment capacities which may be up to about 500 kg of solid.

It is constituted by an assembly comprising:
an outer envelope R;
a parallelepipedal envelope P which is porous on two opposed parallel faces enclosing the thin layer CM of particles to be treated and having communication means S with the exterior of the reactor for admission of solid, and means V which are distinct from the preceding means for its evacuation from said envelope;

at least one diffuser D for reagent gas coupled to the outer porous face of the envelope P;

at least one collector CL of the reaction effluent coupled to the inner porous face of the envelope P;

at least one pipe E for admitting reagent gas into the diffuser D communicating with the exterior of the reactor;

at least one pipe C for recovering reaction effluents from the collector CL communicating with the exterior of the reactor;

at least one pipe S for admitting solid to be treated into the porous envelope P;

at least one pipe V for evacuating treated solid from the envelope P.

The outer envelope R contains the porous envelope or envelopes P enclosing the thin layer or layers CM, the diffuser D, the collector CL and the pipes V for evacuating treated solid.

The assembly of pipes E for admitting reagent gas, S for introducing solid and C for recovering effluents is disposed on an upper flange Bs which will close the reactor by coupling itself to a lower flange Bi which receives corresponding respective recesses for the diffuser D, the thin layer CM and the collector CL.

The term "corresponding recess" means that when the upper flange is coupled to the lower flange, the pipes E for admitting reagent gas communicate with the diffuser D, the pipe C for recovering effluents communicates with the collector CL and pipes S for admitting solid to be treated communicate with the porous envelope P.

Nevertheless, a reactor in which the reagent gas admission pipes E were installed on the side walls of the reactor would also fall within the scope of the invention.

The reactor of FIGS. 1a and 1b corresponds to a planar configuration, i.e. it is constituted by two planar parallel thin layers.

Figure 2B:
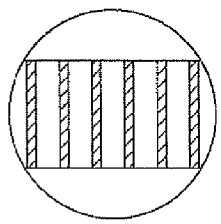
FIG. 2b shows a top view of the same reactor with modules of identical size.

A description of a reactor in a planar configuration comprising a plurality of thin layers and intended for treatment capacities of more than 500 kg of solid per module is given in the detailed description relating FIGS. 2a, 2b, 2e.

The thin layer reactor of the invention operates discontinuously by admitting quantities of solid to be treated in the range 30 kg to 2500 kg, preferably in the range 50 kg to 1000 kg, and more preferably in the range 100 kg to 500 kg, all of these quantities being with respect to one module.

The invention also consists of a process for reducing a catalyst using the reactor of the invention in which the HSV (hourly space velocity) is in the range 0.5 to 5 Nliters/h of $H_2$ per gram of catalyst, preferably in the range 1.5 to 3 Nliters/h of $H_2$ per gram of catalyst.

The operating pressure is in the range 1 to 10 bars absolute, preferably in the range 2 to 6 bars absolute (1 bar=$10^5$ Pascal).

The operating temperature is in the range 200° C. to 500° C., preferably in the range 300° C. to 450° C., and more preferably in the range 350° C. to 400° C.

It should be noted that the temperature changes during the catalyst reduction operation in accordance with a curve which may include one or more stages termed plateaus. The notion of operating temperature must therefore be understood to be the temperature corresponding to the last plateau in the temperature rise curve.

The thickness of the thin layers of each module is calculated so as to be a desired value for the ratio DP/z/Ps in the range 0.1 $m^{-1}$ to 10 $m^{-1}$, preferably in the range 0.5 $m^{-1}$ to 5 $m^{-1}$.

This thickness is generally in the range 10 to 500 mm, preferably in the range 50 to 300 monomer and more preferably in the range 100 to 200 mm.

All of the thin layers of a given module have the same thickness.

The width of each thin layer is generally in the range 0.5 m to 4 m.

The height (or depth) of each thin layer is generally in the range 0.5 m to 4 m.

The invention also consists of a method for operating a reactor in accordance with the invention, consisting of 10 phases in succession which are summarized below:

phase 1: charging solid to be treated into upstream metering devices Dam and flushing with an inert gas, generally nitrogen;

phase 2: charging solid into the modules via the admission means S;

phase 3: flushing the charged module or modules with an inert gas, generally nitrogen;

phase 4: treatment of charged modules with $H_2$ diluted with nitrogen, at a fixed pressure, and following a temperature ramp-up rate in the range 0.5° C. to 5° C./minute;

phase 5: treatment of charged modules in $H_2$, at fixed temperature and pressure, for a fixed period (stages of 4 to 20 hours);

phase 6: flushing of module or modules after treatment using an inert gas, generally nitrogen;

phase 7: discharge of solid using evacuation means V to the downstream metering devices Day;

phase 8: cooling treated solid to a temperature in the range 100° C. to 150° C.;

phase 9: transfer of cooled solid;
a) either directly to the Fischer-Tropsch synthesis reactor;
b) or to the mixer Mj and in this case mixing the solid with paraffin waxes with a melting point of close to 100° C. with a flush of an inert gas, generally nitrogen; or to an intermediate capacity;

phase 10: transfer of solid which may have been coated with waxes into barrels Bs in case b) and possibly c).

DETAILED DESCRIPTION OF THE INVENTION

The description below is made with reference to FIGS. 2a, 2b, 2c corresponding to a planar configuration.

The present invention consists of a fixed bed reactor with thin layers constituted by an assembly of similar modules M functioning in parallel and enclosed in a common vessel constituting the envelope R of said reactor, In the present particular case, the modules are identical.

This reactor is intended to carry out a treatment on a catalytic solid present in the reactor in the form of fine particles generally with a diameter in the range 30 to 100 microns.

This treatment, which the skilled person generally terms reduction, uses a reagent gas which is hydrogen, optionally diluted with an inert gas, generally nitrogen, in any dilution but preferably being between 25% to 35% by volume. Each module M of the reactor is constituted by an assembly comprising:

at least one partially porous envelope P enclosing each thin layer CM of particles to be treated and having communication means with the outside of the reactor for admission of solid, and means distinct from the preceding means for its evacuation from said envelope;

a diffuser D for reagent gas coupled to the porous inlet face of the envelope P;

a collector C1 for reaction effluents coupled to the porous outlet face of the envelope P;

a pipe E for admitting reagent gas into the diffuser D, communicating with the exterior of the reactor;

a pipe C for recovering reaction effluents communicating with the exterior of the reactor;

a pipe S for admitting solid to be treated into the porous envelope P;

a pipe V for evacuating treated solid outside the porous envelope P.

The set of modules M is arranged inside the reactor R so as to form a compact assembly and certain modules may be closed while the reactor is operating.

The term "compact assembly" means that the modules M are disposed in parallel and aligned along the same substantially vertical axis.

The expression "certain modules may be closed while the reactor is operating" means that the reactor may function with a reduced number of modules, the "closed" modules generally being empty of solid.

The porous envelope P is generally constituted by a screen surrounding the outer and inner faces of each thin layer with a mesh size which is generally in the range 1 to 20 microns, and preferably in the range 5 to 10 microns. These screens are generally porous media such as those used in the manufacture of filter cartridges.

The material used for the screens may be of the Inconel type or of the stainless steel type (for example type SS 316L). This type of media is generally obtained by sintering. It has good resistance to deep blocking.

This medium is supported by a perforated plate, a screen or any other means which provides sufficient rigidity.

The assembly of reagent admission pipes E, pipes S for introducing solid to be treated and pipes C for recovering effluents is generally disposed on one side of the vessel R of the reactor, and the assembly of evacuations V for treated solid is generally on the opposite side of the vessel R of the reactor, The assembly of pipes E for admission of reagent gas, pipes S for introducing solid and pipes C for recovering effluents is generally disposed on an upper flange (denoted Bs in FIG. 2a) which closes the upper portion of the reactor by coupling to a lower flange (denoted Bi in FIG. 2a) which receives corresponding recesses respectively of the diffuser D, the thin layer CM and the collector CL.

Preferably, the pipes E for admission of reagent and pipes C for recovering effluents are located on the same side of the module. However, a module in which the pipe E for admitting reagent and the pipe C for recovering reaction effluent were located on opposite sides would also fall within the scope of the invention.

In an annular configuration (not shown in FIG. 2), the reaction fluid could be introduced laterally, i.e. via a pipe which enters the diffuser D substantially horizontally.

The pipe S for admitting solid to be treated into the module under consideration is located on the side on which the pipes E for admitting reagents is found, and the pipe V for evacuating treated solid is located on the opposite side.

FIG. 2 shows solid admission via the upper portion (top of the reactor) and evacuation of treated solid via the lower portion (bottom of the reactor). A module may have a cylindrical or a planar geometry.

The cylindrical geometry is characterized in that the module under consideration has a substantially vertical axis of revolution and in that the thin layer of solid has a substantially annular form.

The outer face of the thin layer is in communication with the diffuser D which is also annular in form, surrounding said thin layer over the whole of its outer lateral surface.

This diffuser D allows the reagent gas to be distributed over the whole of the outer lateral surface of the thin layer.

The inner face of the thin layer is in communication with a collector C, termed the central collector, since it is formed as a cylinder which receives the reaction effluent collected over the whole of the inner lateral surface of the thin layer of solid.

A module with a cylindrical geometry has a height which is generally in the range 0.5 m to 4 m, and a diameter which is generally in the range 0.5 m to 4 m.

The thickness of the annular layer is generally in the range 10 to 500 mm, preferably in the range 50 mm to 300 mm, and more preferably in the range 100 to 200 mm.

To reduce the residence time of the water produced, the ratio DP/z/Ps is in the range 0.1 to 10 $m^{-1}$, and preferably in the range 0.5 $m^{-1}$ to 5 $m^{-1}$.

The number of modules contained in the reactor is generally in the range 2 to 20, and preferably in the range 4 to 12.

One module, for example module M1, is constituted by a diffuser D1, a first thin layer $C_{M1}$ and a central collector $C_{L1}$ and a second thin layer $CM_{M1}$.

The diffuser D2 of the neighbouring module M2 thus supplies both the second thin layer of module M1 and the first thin layer of module M2 with reagent gas. The notations "first and second thin layer" are purely arbitrary and correspond to reading FIG. 2 from left to right, The modules have the same height and their width is limited so as to form a rectangular assembly as shown in FIG. 2b which is a top view of FIG. 2a.

Figure 2C:
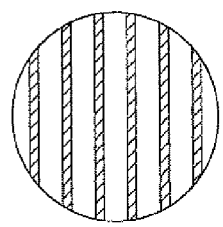
FIG. 2c shows a top view of this reactor with different sized modules.

An assembly of modules with different widths as shown in the top view of FIG. 2c also falls within the scope of the present invention.

The effluents are collected for each module via the central collector of the module concerned, for example by collector $C_{L1}$ for module M1.

The solid can be evacuated from each module to a reservoir V which belongs to each module or is common to the assembly of modules, as shown in FIG. 2a.

A module with a planar geometry generally has a height in the range 0.5 m to 4 m, and a width which is generally in the range 0.5 m to 4 m.

The thickness of the thin layer is generally in the range 10 to 500 mm, preferably in the range 50 to 300 mm, and more preferably in the range 100 mm to 200 mm.

The number of modules contained in the reactor is generally in the range 2 to 20, and preferably in the range 4 to 12.

The reagent gas is constituted by a mixture of hydrogen and nitrogen, the degree of nitrogen dilution (i.e. the percentage by volume of nitrogen in the mixture) preferably being in the range 25% to 35% by volume.

Generally, the hydrogen used has a maximum oxygen content of 50 ppm, preferably less than 10 ppm and more preferably less than 2 ppm.

The hydrogen used has a CO content of less than 50 ppm, preferably less than 10 ppm, and more preferably less than 1 ppm, and a $CO_2$ content of less than 1000 ppm, preferably less than 150 ppm, and more preferably less than 20 ppm.

It is possible to admit into the hydrogen a certain quantity of light hydrocarbons containing 1 to 4 carbon atoms, generally methane. The maximum quantity of hydrocarbons is less than 15% by volume, preferably less than 5% by volume, and more preferably less than 1% by volume.

The dew point of the hydrogen is generally in the range −60° C. to 0° C., preferably in the range −50° C. to −30° C., and more preferably in the range −50° C. to −40° C.

Preferably, before dilution in nitrogen the hydrogen is more than 99.95% by volume pure.

The HSV of the reactor, which is substantially identical for each module, is generally in the range 0.5 to 5 Nliters/h of $H_2$ per gram of catalyst, preferably in the range 1.5 to 3 Nliters/h of $H_2$ per gram of catalyst.

The quantity of catalyst contained in a module is generally in the range 30 kg to 2500 kg, preferably in the range 50 to 1000 kg, and more preferably in the range 100 to 500 kg.

The pressure at the reactor inlet is in the range 1 to 10 bars absolute (1 bar=$10^5$ Pascal), preferably in the range 2 to 6 bars absolute.

The maximum reduction temperature is in the range 200° C. to 500° C., preferably in the range 300° C. to 450° C., and more preferably in the range 350° C. to 400° C.

This maximum reduction temperature must be taken to be the temperature of the last stage in the temperature rise curve.

The temperature rise during the reduction reaction is generally in the form of a succession of ramps and plateaus, the slope of the ramps generally being in the range 0.5° C. to 5° C./minute. The ramps separating the various plateaus may be different while remaining in the range of 0.5° C. to 5° C./minute.

When the maximum temperature is attained, the plateau corresponding to said maximum temperature may last in the range 4 hours to 20 hours, preferably in the range 8 hours to 16 hours.

EXAMPLE OF THE INVENTION

The reactor of the invention described below was intended to carry out reduction of a catalyst based on cobalt before its use as a Fischer-Tropsch synthesis catalyst.

The quantity of catalyst to be treated was 80 kg.

The catalyst was in the form of particles with a diameter in the range 30 to 90 microns.

The reducing gas was 99.9% pure hydrogen diluted with 30% by volume of nitrogen.

The operating conditions for reduction were as follows:
Pressure (Ps): 4.0 bars absolute;
Temperature of last plateau (T): 400° C.;
HSV: 2 Nliters/hour per gram of solid to be treated.

The reactor was constituted by 2 identical modules, the dimensions of each module being as follows:
Thickness: 160 mm;
Width: 300 mm;
Height: 800 mm.

The modules were disposed vertically and parallel and were enclosed in a cylindrical vessel 1200 mm high and with an external diameter of 600 mm.

Each module as shown in FIG. 2 was constituted by two identical thin layers $C_{M1}$ each supplied via a diffuser D1 and D2 and having a common effluent collector $C_{L1}$. The diffuser D2 supplied both the thin layer coupled to the first module and the thin layer coupled to the second module.

Each thin layer was enclosed by a wall which, on the lateral planes (corresponding to the width and height of said thin layer), was constituted by a screen with a mesh of 5 microns.

The ratio DP/z/Ps was: 0.66 $m^{-1}$.

Figure 3:
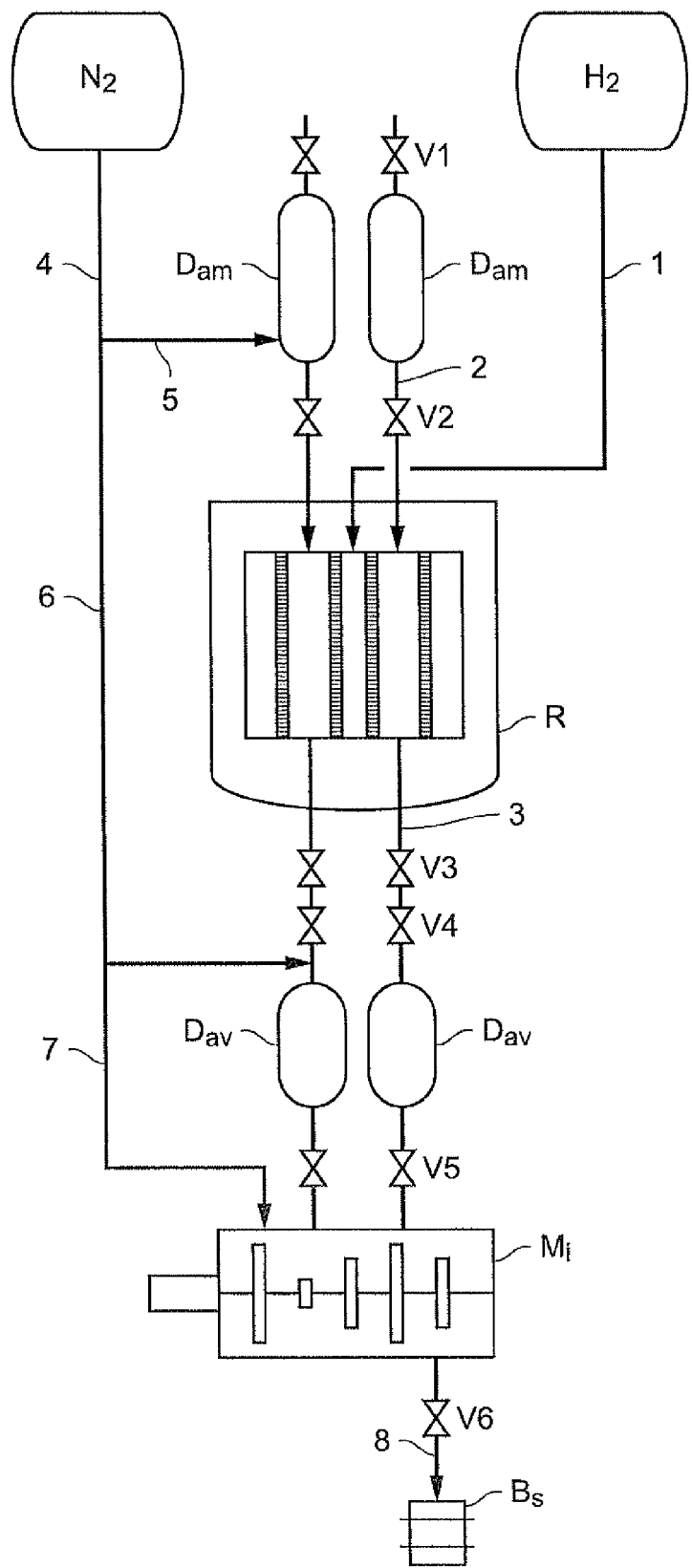
FIG. 3 corresponds to a flowchart for a complete unit comprising upstream metering devices upstream of the reactor of the invention, and downstream metering devices downstream of the reactor of the invention. This Figure also shows valves V1, V2, V3, V4, V5, V6 which allow said reactor to function discontinuously.

The complete sequence of operations can be described as follows with the aid of FIG. 3:
phase 1: charging solid to be treated into upstream metering devices $D_{am}$ And flushing with nitrogen via line 5;
phase 2: opening valves V2 and charging solid into modules of the reactor R via the admission means S by means of line 2;
phase 3: flushing the module or modules charged with solid, using nitrogen via line 5;
phase 4: closing valves V2, treatment of modules charged with solid in $H_2$ (supplied via line 1 at a pressure of 4 bars absolute, and following a temperature ramp-up of 3° C./minute);
phase 5: treatment of charged modules in $H_2$, at a temperature of 400° C. for a period of 12 hours;
phase 6: flushing module or modules after treatment with nitrogen;
phase 7: opening valves V3, V4 and discharging solid via evacuation means V to downstream metering devices Day via line 3;
phase 8: cooling treated solid to a temperature of 100° C.;
phase 9: opening valves V5 and transferring cooled solid to the mixer $M_j$ And in this case mixing the solid with paraffin waxes with a melting point close to 100° C. while flushing with inert gas, generally nitrogen;
phase 10: transfer of solid which may have been coated with waxes into barrels Bs by opening valve V6.

The invention claimed is:

1. A method for operating a fixed bed reactor with thin layers having a thickness in the range 10 to 500 mm, intended for the treatment of solid particles with a size in the range 30 to 100 microns, said reactor comprising:
a plurality of similar modules (M) operating in parallel, enclosed in a common vessel (R) of said reactor, wherein each module (M) comprises:
at least two thin layers (CM), having a thickness in the range 10 to 500 mm, of solid particles, with a size in the range 30 to 100 microns, wherein each thin layer is enclosed by a partially porous envelope (P) partially porous envelope (P) having a porous inlet face and a porous outlet face;
each of the porous inlet faces of the partially porous envelopes is coupled with at least one diffuser (D) for introduction of reagent gas, wherein diffusers between two adjacent modules are coupled to a porous inlet face of a partially porous envelope in each of said two adjacent modules;
each of the porous outlet faces of the partially porous envelopes is coupled with at least one collector (CL) for removal of effluents;
at least one pipe (E) for admitting reagent gas into said at least one diffuser (D), wherein said at least one pipe (E) for admitting reagent gas communicates with the exterior of the reactor;
at least one pipe (C) for recovering reaction effluents, wherein said at least one pipe (C) for recovering reaction effluents communicates with the exterior of the reactor;
at least one pipe (S) for admitting solid particles to be treated into the partially porous envelopes (P);
at least one pipe (V) for evacuating treated solid particles from the partially porous envelopes (P), distinct from said at least one pipe (S) for admitting solid particles;
said plurality of modules (M) being arranged inside said common vessel (R) so as to form an assembly with a planar or cylindrical geometry;
said method comprising the following phases in succession:
phase 1: charging solid particles to be treated into upstream metering devices ($D_{am}$) and flushing with an inert gas;
phase 2: charging solid particles into at least one of said plurality of modules via said at least one pipe (S) for admitting solid particles;
phase 3: flushing the charged module or modules with an inert gas;

phase 4: treating the charged module or modules with $H_2$ diluted with nitrogen, at a fixed pressure, and following a temperature ramp-up rate in the range 0.5° C. to 5° C./minute;

phase 5: treating the charged module or modules in $H_2$, at fixed temperature and pressure, for a fixed period (stages of 4 to 20 hours);

phase 6: flushing the charged module or modules after treatment using an inert gas;

phase 7: discharging solid particles from the charged module or modules using said at least one pipe (V) for evacuating treated solid particles to downstream metering devices (Dav);

phase 8: cooling treated solid particles to a temperature in the range 100° C. to 150° C.; and phase 9: transferring cooled solid particles;
  a) directly to a Fischer-Tropsch synthesis reactor;
  b) to a mixer ($M_j$) wherein the cooled solid particles are mixed with paraffin waxes having a melting point of close to 100° C. with a flush of inert gas, and transferring solid particles which have been coated with waxes into barrels (Bs); or
    to an intermediate capacity, and optionally transferring solid particles into barrels (Bs).

2. The method according to claim 1, in which the number of modules (M) in the fixed bed reactor is in the range of 4 to 12.

3. The method according to claim 1, in which, for each thin layer (CM), the ratio of the linear pressure drop across the thin layer (DP/z) over the pressure at the outlet from said thin layer (Ps) is in the range of 0.5 $m^{-1}$ to 5 $m^{-1}$.

4. The method according to claim 1, in which said partially porous envelope (P) is constituted by a screen with a planar form having a mesh with a dimension in the range of 5 to 10 microns.

5. The method according to claim 1, wherein said solid particles are catalyst particles used for Fischer-Tropsch synthesis, and the hourly space velocity is in the range of 1.5 to 3 Nliters/h of $H_2$ per gram of catalyst.

6. The method according to claim 1, wherein said solid particles are catalyst particles used for Fischer-Tropsch synthesis, and the maximum temperature in phase 5 is in the range of 350° C. to 400° C.

7. The method according to claim 1, wherein each of said thin layers has an annular form.

8. The method according to claim 1, wherein each of said thin layers has a parallelepipedal form.

9. The method according to claim 1, wherein said solid particles are catalyst particles used for Fischer-Tropsch synthesis, and for each thin layer (CM), the ratio of the linear pressure drop across the thin layer (DP/z) over the pressure at the outlet from said thin layer (Ps) is in the range 0.1 $m^{-1}$ to 10 $m^{-1}$.

10. The method according to claim 2, wherein for each thin layer (CM), the ratio of the linear pressure drop across the thin layer (DP/z) over the pressure at the outlet from said thin layer (Ps) is in the range of 0.5 $m^{-1}$ to 5 $m^{-1}$.

11. The method according to claim 1, wherein the quantity of solid particles contained in each module (M) is in the range 50 to 1000 kg.

12. The method according to claim 1, wherein said at least one pipe (E) for admission of reagent gas, said at least one pipe (S) for admission of solid particles to be treated, and said at least one pipe (C) for collecting effluents are disposed on an upper flange of said reactor which closes an upper portion of said reactor.

13. The method according to claim 1, wherein each module (M) has a planar geometry, with a height in the range 0.5 to 4 m, a width in the range 0.5 to 4 m, and a thickness of the thin layer of solid particles to be treated in the range 50 mm to 300 mm.

14. The method according to claim 13, wherein each module (M) has a thickness of the thin layer of solid particles to be treated in the range of 100 mm to 200 mm.

15. The method according to claim 1, wherein the number of modules (M) in the reactor is in the range 2 to 20.

16. The method according to claim 1, wherein, for each thin layer (CM), the ratio of the linear pressure drop across the thin layer (DP/z) over the pressure at the outlet from said thin layer (Ps) is in the range 0.1 $m^{-1}$ to 10 $m^{-1}$.

17. The method according to claim 1, wherein the quantity of solid particles to be treated per module of the reactor is in the range 100 to 500 kg.

18. The method according to claim 1, wherein said partially porous envelope (P) is constituted by a screen with a planar form having a mesh with a dimension in the range 1 to 20 microns.

19. The method according to claim 1, wherein said solid particles are catalyst particles used for Fischer-Tropsch synthesis, and the hourly space velocity is in the range 0.5 to 5 Nliters/h of $H_2$ per gram of catalyst.

20. The method according to claim 1, wherein said solid particles are catalyst particles used for Fischer-Tropsch synthesis, and the maximum temperature in phase 5 is in the range 300° C. to 450° C.

21. The method according to claim 1, wherein said solid particles are catalyst particles used for Fischer-Tropsch synthesis, and the ramp-up followed for the reactor temperature rise is in the range 1° C. to 5° C./minute.

22. The method according to claim 1, wherein said solid particles are catalyst particles based on a noble metal employed for reforming oil cuts with a distillation range in the range of 80° C. to 300° C.

* * * * *